(12) United States Patent
Dessouky et al.

(10) Patent No.: US 9,313,326 B2
(45) Date of Patent: Apr. 12, 2016

(54) SYSTEM AND METHOD FOR DETERMINING AND ACTING UPON A USER'S ASSOCIATION TO A ZONE OF RELEVANCE

(75) Inventors: Khaled I. Dessouky, Studio City, CA (US); Mario Proietti, Fullerton, CA (US); Brenda C. Schafer, Carlsbad, CA (US)

(73) Assignee: TECHNOCOM CORPORATION, Carlsbad, CA (US)

( * ) Notice: Subject to any disclaimer, the term of this patent is extended or adjusted under 35 U.S.C. 154(b) by 256 days.

(21) Appl. No.: 13/314,941

(22) Filed: Dec. 8, 2011

(65) Prior Publication Data
US 2013/0151506 A1 Jun. 13, 2013

(51) Int. Cl.
G06F 17/30 (2006.01)
H04M 3/42 (2006.01)
G06Q 30/02 (2012.01)
G06F 7/00 (2006.01)
H04W 4/02 (2009.01)

(52) U.S. Cl.
CPC ........... *H04M 3/42348* (2013.01); *G06Q 30/02* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 6,801,850 B1 * | 10/2004 | Wolfson | 701/410 |
| 7,164,986 B2 | 1/2007 | Humphries et al. | |
| 7,254,388 B2 | 8/2007 | Nam et al. | |
| 7,848,765 B2 | 12/2010 | Phillips et al. | |
| 7,870,229 B2 | 1/2011 | Spector | |
| 8,019,532 B2 | 9/2011 | Sheha et al. | |
| 2006/0041548 A1 * | 2/2006 | Parsons et al. | 707/5 |
| 2006/0276201 A1 * | 12/2006 | Dupray | 455/456.1 |
| 2009/0171939 A1 * | 7/2009 | Athsani et al. | 707/5 |
| 2010/0115035 A1 * | 5/2010 | Malhar et al. | 709/206 |
| 2011/0087741 A1 * | 4/2011 | Stern et al. | 709/206 |
| 2013/0117381 A1 * | 5/2013 | Garcia et al. | 709/206 |

* cited by examiner

*Primary Examiner* — Usmaan Saeed
*Assistant Examiner* — Yu Zhao
(74) *Attorney, Agent, or Firm* — Lewis Roca Rothgerber Christie LLP

(57) ABSTRACT

A computer-implemented method for determining a zone of relevance for locating a wireless end-user and making a user notification decision including: storing information related to the enterprise in an enterprise database; storing information related to the end-user in an end-user database; accessing said enterprise and user end databases to extract enterprise and end-user related information; accessing a geographical database to extract geographic information, based on information obtained from the enterprise database; extracting relevant dynamic inputs from external sources via a predefined application programming interface; determining a value for the user notification based on weighting of said extracted information and historical use information; determining a zone of relevance for the wireless end-user; and notifying a user, wherein notifying the user meets predetermined criteria for the determined value of notification.

9 Claims, 6 Drawing Sheets

SYSTEM AND METHOD FOR DETERMINING AND ACTING UPON A USER'S ASSOCIATION TO A ZONE OF RELEVANCE

FIELD OF INVENTION

The present invention relates generally to the field of mobile wireless communication, and more particularly to a system and method for determining a value of notification of an end user, and determining an appropriate zone of relevance for such notification to meet certain objectives.

BACKGROUND

With the proliferation of GPS devices in commercial applications over the last decade and a half, various methods to leverage the positioning capability in mobile devices to perform geographically-based functions have emerged. For example, U.S. Pat. No. 7,164,986 discloses a method and system to track devices and ensure their route adherence via geofencing. With the proliferation of location capabilities in wireless networks and handsets, methods have also emerged to extend such geographic locating capabilities to cellular devices and leverage information that may exist in the wireless network. Also, U.S. Pat. No. 7,254,388 discloses a system for mobile station-assisted triggers and service methods wherein a location assistant on the handset (e.g., a module and application) plays an assisting role in simplifying and making more efficient the task of identifying whether the mobile device approached, entered or exited a certain geographic zone, consequently triggering certain actions. Further, U.S. Pat. Nos. 7,848,765 and 7,870,229 have extended these concepts for location-based services (LBS), such as for the support of location-based advertising or geographic zone-based services. U.S. Pat. No. 8,019,532 focuses on defining a specific boundary (e.g., a polygon or shape) about a point of interest (POI) on a map for the purposes of offering services to a mobile device, in particular a smartphone with location determination capabilities and the ability to save such contours for the purposes of acting upon them.

Common to the above-mentioned inventions is the important role played by the mobile device in actively defining the geographical boundary and in leveraging the device's intelligence in reducing the amount of required communication and location determination transactions. Those transactions are required to support and operate the intended application such as geographically-based services or alerts. However, the end user mobile devices may not have a location module, a location application, or ample processing power The potential lack of user device sophistication (e.g., no Smartphone, no GPS, or GPS not enabled) or desire for active participation (e.g., via downloading a location-based application to the handset) implies an increased need for network intelligence and actions to communicate with and to locate the end user. Whether it is a call or a data session for communication or a "location dip" to locate the user, these transactions have an associated cost to the enterprise, especially if they need to be done liberally or repeatedly. They can easily reduce the business value of the service or feature offered by the enterprise.

The management and optimization of these underlying transactions is critical when the subject location based service is implemented with almost exclusive reliance on the server side capability, with minimal participation from or reliance on the mobile device, as envisioned in a preferred embodiment of the present invention.

SUMMARY

The present invention is directed to cases where the end user mobile device may not have a location module, a location application, or ample processing power and yet, an enterprise to which this end user belongs, or an enterprise that desires to reach such end user, can still achieve its objectives in an optimized, cost effective manner. Not relying on the mobile device capability allows the enterprise a much wider reach to potential end users or subscribers. Such users could be as varied as mobile workers in a dispatch application, to couriers, to subscribers of a roadside or personal assistance service, to members of a store loyalty program, or clients of a financial institution.

In some embodiments, the present invention is a computer-implemented method for determining a zone of relevance for locating a wireless end-user and making a user notification decision. The method including: storing information related to the enterprise in an enterprise database; storing information related to the end-user in an end-user database; accessing said enterprise and user end databases to extract enterprise and end-user related information; accessing a geographical database to extract geographic information, based on information obtained from the enterprise database; extracting relevant dynamic inputs from external sources via a predefined application programming interface; determining a value for the user notification based on weighting of said extracted information and historical use information; determining a zone of relevance for the wireless end-user based on comparing a notification value-cost ratio to a threshold; and notifying a user based on the presence of the wireless end user within the zone of relevance, wherein notifying the user meets predetermined criteria for the determined value of notification. Often, the notification is a notification to the wireless end users when it is inside the zone of relevance, but it could also be a notification to a third party (e.g., a parent or a customer waiting for a delivery) when the wireless user is within the zone of relevance.

In some embodiments, the present invention is a computer-implemented method for deciding whether and how to notify a user. The method including: determining applicable location determination methods within a zone of relevance of a mobile user, based on information in an enterprise database, an end-user database, a geographical database, and dynamic inputs from a wireless network; determining applicable notification methods within the zone of relevance, based on information in said enterprise database, end-user database, and geographic database; determining costs associated with the applicable location determination methods and the applicable notification methods; performing a notification value-cost comparison by comparing a notification value-cost ratio to a threshold; making a decision to notify a user, based on the value-cost comparison; selecting a notification method with highest value to cost ratio; and using the selected notification method to notify the user.

In some embodiments, the present invention is a computer-implemented method for deciding whether and how to locate a mobile user. The method including: determining applicable location determination methods within a zone of relevance, based on information in an enterprise database, an end-user database, a geographical database, and dynamic inputs from a wireless network; determining applicable notification methods within the zone of relevance, based on information in said enterprise database, said end-user database, and said geographical database; determining costs associated with the applicable location determination and the applicable notification methods; performing a notification value-cost comparison for the determined costs by comparing a notification value-cost ratio to a threshold; making a user notification decision; and determining a location determination quality and update requirement for the mobile user commensurate with a decision to notify or not to notify a user.

DETAILED DESCRIPTION

Figure 1:
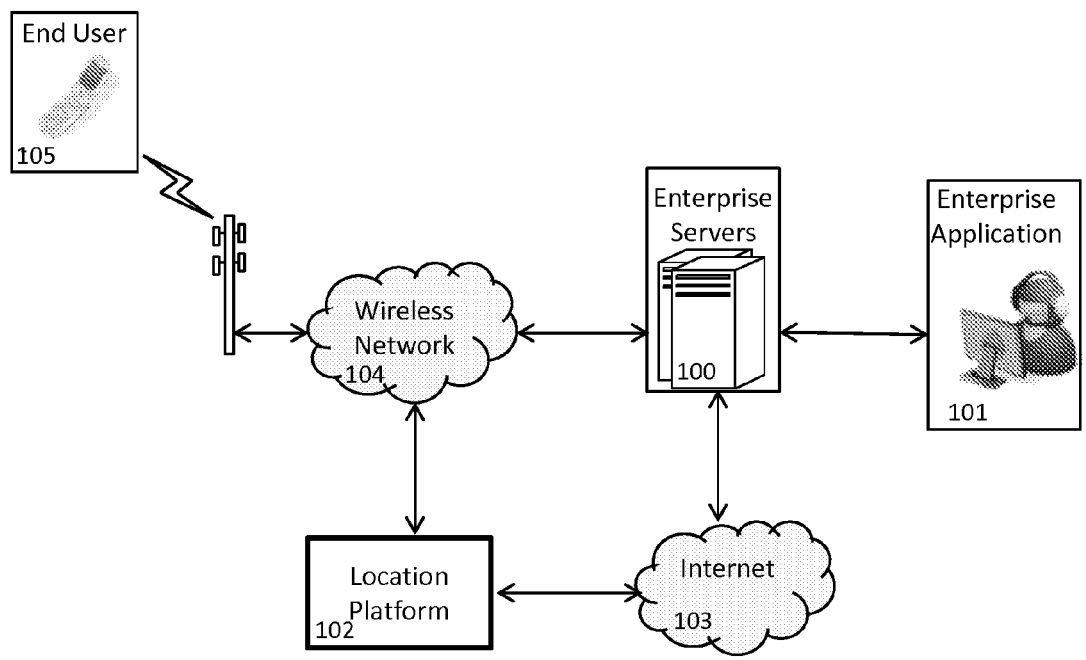
FIG. 1 shows an illustrative block diagram of a wireless system offering location based services, according to some embodiments of the present invention.

FIG. 1 illustrates an exemplary block diagram of a system offering location based services according to some embodiments of the present invention. In the illustrated example, an enterprise (100) utilizes the location platform (102) and the location service provider operating that platform to manage the connectivity to a target mobile end user (105). The enterprise could be a provider or user of mobile marketing, workforce management, asset tracking, transportation management, emergency alerting, call centers, banking or fraud detection, among others. The end user could be a member of a group belonging to or affiliated with the enterprise (e.g., a tow truck, a service van), could be a subscriber of a service offered by the enterprise (e.g., roadside assistance, personal assistance, fraud detection), or could be a marketing target of an enterprise (e.g., a chain store, a company with a loyalty program).

Connectivity between the enterprise servers and the location platform is typically via the Internet, although dedicated connectivity for large enterprises is also possible. Connectivity is via an established protocol over a well-defined application programming interface (API) agreed upon between the enterprise and the location service provider. The location platform is able to reach the mobile end-user for purposes of locating and notifying the user via a wireless network (104), for example, that of a wireless carrier. It is also possible, albeit not shown in the figure, that notification is sent to a 3$^{rd}$ party, different from the mobile end-user to be located. Examples of such 3$^{rd}$ parties could be an enterprise, an affiliate or a customer of an enterprise, or an interested individual such as a parent. Such notification could take place via a wired or a wireless network.

For maximum utility and value to the enterprise in this context, the mobile end-user device may or may not contain sophisticated location capabilities, such as a GPS module, or features common to so-called smartphones, like powerful processing, advanced operating system, location based applications, or a sizeable screen. If the device contains such capabilities its user may not be a sophisticated user or be a willing participant in downloading application software or even turning on a GPS-type location capability. The present invention is particularly suited to handling end user devices with limited capabilities available or enabled by optimizing the location determination and notification process on the location server side. Such mobile devices are often the most challenging to the location service from a cost perspective since their intelligence is not utilized in assessing their presence relative to a geographical zone of interest. This could lead to repeated attempts at determining user location and communicating with the user with rapidly increasing costs.

Figure 2:
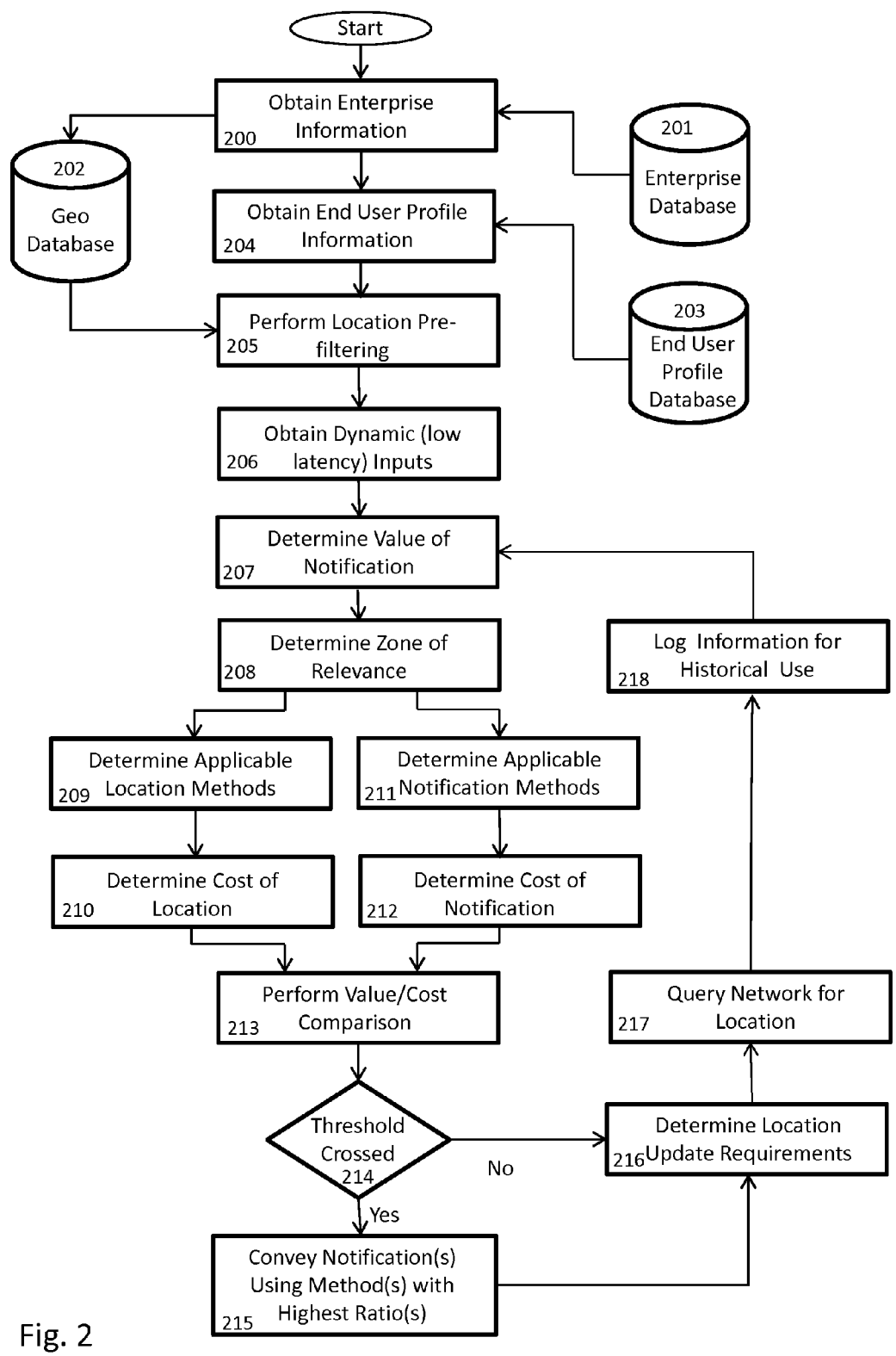
FIG. 2 shows a logical flow chart for the processing in the location platform pertaining to zone of relevance determination and action, according to some embodiments of the present invention.

FIG. 2 shows an exemplary flow diagram of the processes within the location platform (102) pertaining to determining and acting upon a zone of relevance for the targeted user (or users), according to some embodiments of the present invention. The processing in the flow is triggered by one of multiple events. In some embodiments, a request is received from the enterprise to perform a location based transaction such as locate one or more users of a certain type in a certain general area, possibly to effect a dispatch operation, route a mobile call to its nearest call center, push information, or issue a specific alert. In some embodiments, the process is triggered by receiving information on a real time event affecting users associated with an enterprise or a group of end users, e.g., severe winter weather advisory.

Inputs to the process are first aggregated, including, in one embodiment, gathering information from an enterprise database (201), an end-user database (203), a geographic database (202), as well as dynamic inputs, which include real time or low latency information from third parties. Such parties could be affiliated with the enterprise, a wireless carrier, a weather service, a traffic service, a fraud detection service or the like.

Figure 3:
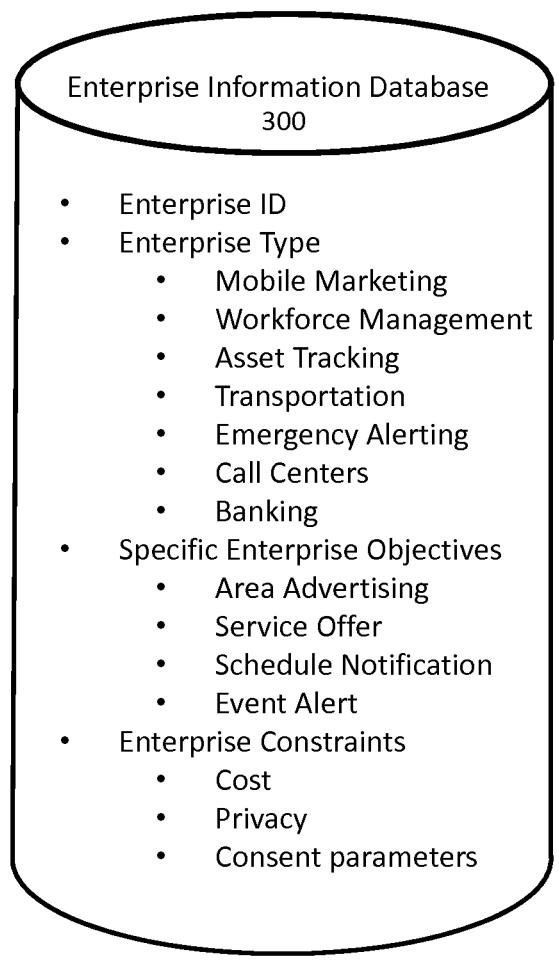
FIG. 3 shows an exemplary content of an enterprise database, according to some embodiments of the present invention.

Information pertaining to enterprises with an agreement with the location service operating the location platform is stored in the enterprise data base (201). Exemplary information in such a database is illustrated in FIG. 3. In some embodiment, database (300) includes data fields that identify the enterprise, its type (e.g., workforce management, mobile marketing, call center, alerting), its location based service objectives (e.g., area advertising, offer promotion, fleet members notification, geographic call routing, customer alerting), along with service rules pertaining to the enterprise, such as cost constraints, information latency requirement, privacy and end user consent rules.

Figure 4:
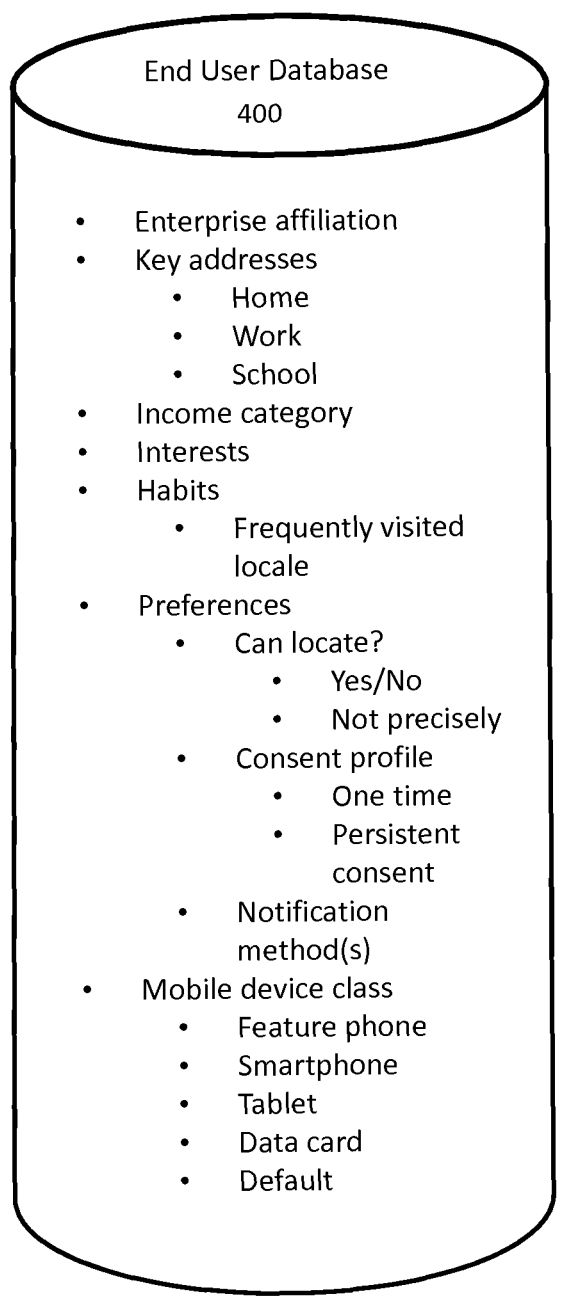
FIG. 4 shows an exemplary content of an end user database, according to some embodiments of the present invention.

FIG. 4 shows an exemplary content of an end user database, according to some embodiments of the present invention. In some embodiments, identification of the end user or pool of end users is performed beforehand by the enterprise, prior to any location transaction being performed. As illustrated in FIG. 4, the end user database (400) stores this identification information and enterprise affiliation (e.g., membership) along with supplementary information driven by the type of application supported by the enterprise. In some cases, where the enterprise is focused on targeting mobile marketing offer, for example, information on the user's purchasing preferences (obtained from the enterprise), location and notification consent settings, key addresses (e.g., home, work, school addresses), habits (e.g., stop for shopping along the way from work to home), income category, previous response to similar location based services, and type of user device are stored in that database. In other cases, as in a workforce management application, information on the capability of the end user (e.g., type of tow truck), may be stored in the database along with the task and route normally assigned to that user.

Figure 5:
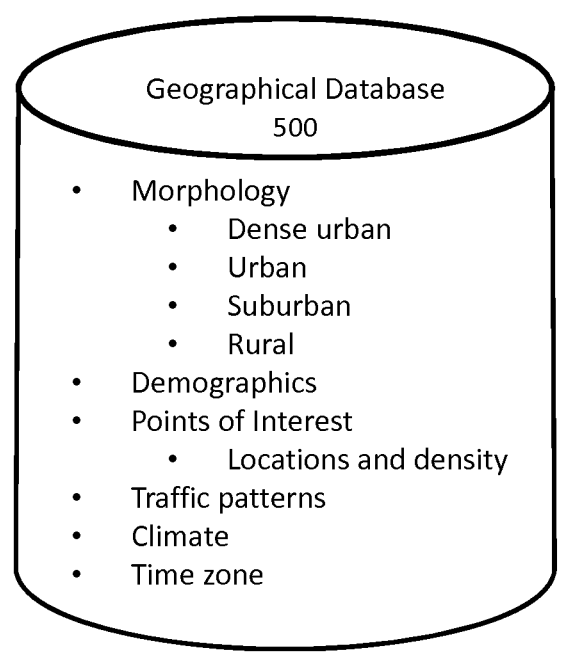
FIG. 5 shows an exemplary content of a geographical database, according to some embodiments of the present invention.

FIG. 5 illustrates the contents of an exemplary geographical database (500), according to some embodiments of the present invention. Information obtained from the enterprise is used to key on geographic attributes that will subsequently influence the parameters of the zone of relevance and the communication and location determination costs associated with it. Information in this database includes the morphology or land use in the general target area (urban, suburban, etc.), location and density of certain points of interest to the enterprise (e.g., its outlets, preferred service facilities, spots of population aggregation), established traffic patterns and rush hours, along with general climate data (zones of relevance may become smaller in a frigid climate for example).

The information obtained from the databases 201/300, 202/400, and 203/500 is sufficient for the logic in Perform Location Pre-filtering (205) to be exercised to bound the area of interest to the enterprise and the general area where the end user is likely to be, and doing so without needing to perform an actual "location dip;" i.e., without a request to the wireless network to determine the actual location of that end user. Such a location transaction would entail cost that may not be warranted if notifying or tracking the user relative to a certain zone is determined to be unnecessary. Hence a rough prediction of the likely area of overlap is first undertaken.

In some embodiments, the longer term information obtained from the databases 201/300, 202/400 and 203/500 may be augmented with dynamic, low latency or real time inputs (206) from other sources. Such information could be critical in impacting the subsequent logic related to determining the value of notification and zone of relevance. The sources of such low latency information could be: (i) the enterprise itself (e.g., a high criticality event has occurred that needs a wide and urgent response, inventory status of a certain product in a certain area); (ii) a wireless carrier providing information about the presence of an end-user on its network; (iii) a third party, like a weather service, a traffic service, a local authority issuing time-relevant alerts (a major incident could reduce the size of a zone where it's of value to reach users), or an information aggregator.

Figure 6:
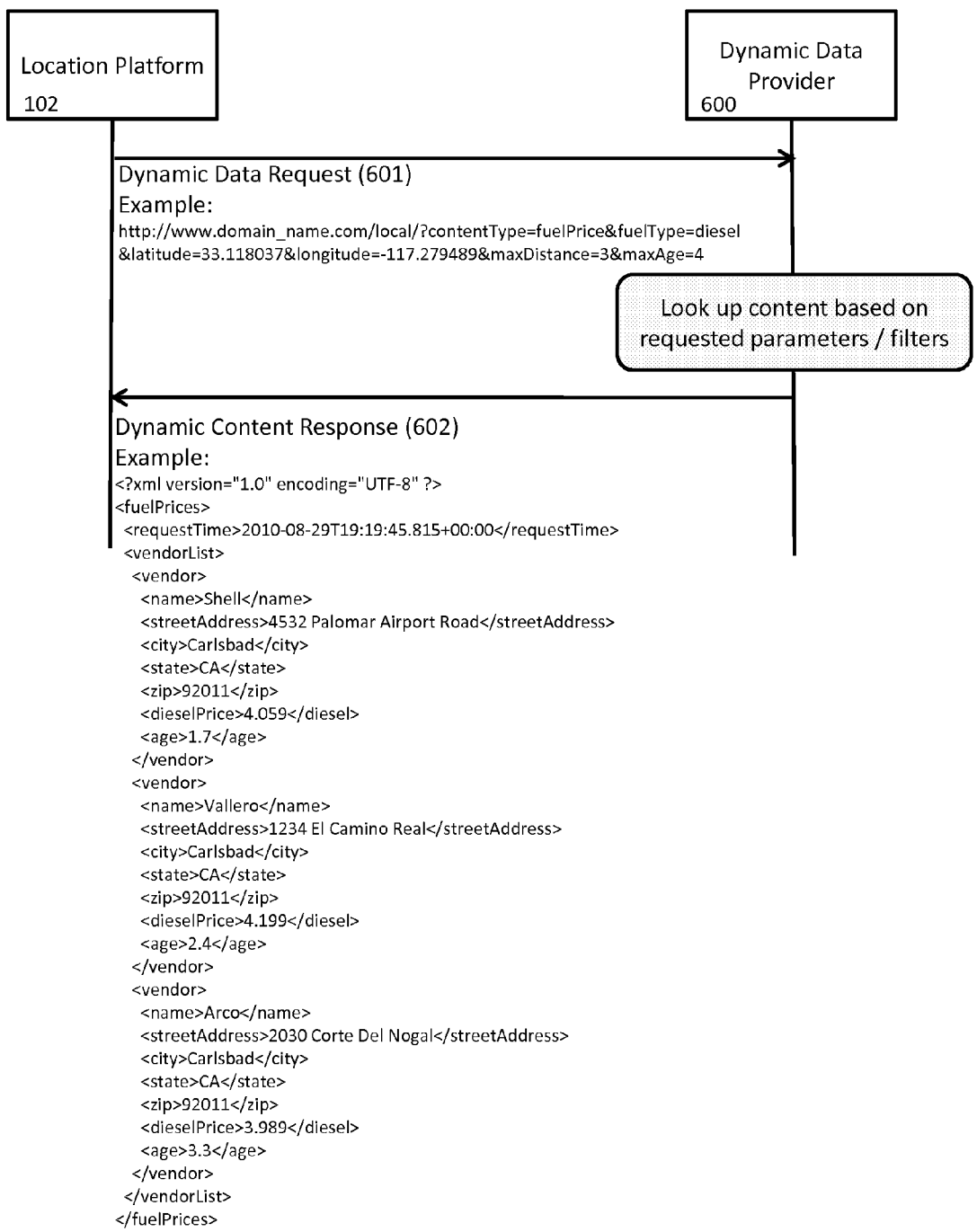
FIG. 6 shows an exemplary data flow to obtain dynamic (low latency) inputs from a third party, according to some embodiments of the present invention.

FIG. 6 shows an exemplary data flow to obtain dynamic (low latency) inputs from a third party, according to some embodiments of the present invention. As shown, in some embodiments, the interface with the third parties is through a defined application programming interface (API). As shown, the figure depicts a request for dynamic data (601) from the location platform (102) to the dynamic data provider (600) and its corresponding response (602), using a Web services API with an XML response. In this illustrative example, the request (601) is to obtain real time fuel prices, in this case diesel, in a certain area about a set of geographic coordinates. Such an information request could be in support of a trucking enterprise that wishes to notify its nearby trucks of the cheapest fuel prices available in a certain geographic vicinity. Some of the possible content filters or query parameters, as illustrated in (601), include: content type, desired location, maximum distance, maximum information age, minimum validity period, etc. The exemplary response (602) contains a list of identified fuel stations, their addresses, fuel prices, and information aging parameters.

Referring back to FIG. 2, the logic in Determine Value of Notification (207) entails an assignment of individual values to the information obtained from the enterprise (200), end-user profile (204), geographic information (202), dynamic or low latency external inputs (206), and historical information (218). In one embodiment a weighted average of these values is determined to render a value for the notification; i.e., a value for attempting to reach and locate the end-user, both actions entailing expending resources, including direct costs.

By way of example, for an enterprise marketing certain offers, the value of notification would be higher if the end-user has a profile that matches a likely purchaser based on: (i) history of utilization, (ii) their habits and preferences in their end-user profile; (iii) the points of interest for the enterprise (e.g., it's stores) likely to be along the user's path during a certain time window (e.g., their typical window for commute from work to home). On the other hand, the value of notification for the merchant enterprise would be lower if the end-user, per its profile, is not providing consent for it to be located.

By way of another example, the value of notification for a roadside assistance enterprise would be higher if the one or more end-users are based, per their profile, close to a impending event (e.g., tow trucks with home bases within reach of a freezing rain event). In yet another example, in an asset management situation, the value of notification may be directly related to the value of the cargo or asset, such value would be obtained either form the enterprise or a dynamic input. In a corresponding example in a banking and fraud mitigation context, the value of notification would rise with the value of the high risk financial transaction, which is determined based on a dynamic input from the banking enterprise or an affiliated fraud detection bureau (a designated $3^{rd}$ party).

Determine Zone of Relevance (208) entails a determination of how wide (e.g., city, county, several miles on highway) or how narrow (e.g., few city blocks, campus boundary) where the target end user is likely to be of significant value to the enterprise. This varies with the nature of the enterprise, its application, it's cost constraints (in 201 and 300) as well as geographical factors (in 202 and 500) such as area type (e.g., urban), points of interest and their density (e.g., stores, outlets), time zone and traffic patterns (a zone of relevance may be smaller during established rush hours). Information obtained from the enterprise and the geographic database are combined with historical information and utilized in this zone of relevance determination. Also used in this determination is information from the end-user database regarding its location and notification preferences.

With the establishment of a quantitative value for end-user notification and a specific zone where such notification is applicable, the next logical step in a preferred embodiment is determining the available and applicable options to locate and notify the end user and their associated costs.

In a location based services context where the location information is obtained from the wireless carrier serving the end user, several forms of location determination may be available and often bear different costs. The wireless carrier's network may be a CDMA, GSM, UMTS, LTE or other network. A coarse location could be a cell ID type of information. A medium accuracy location could be an enhanced cell ID, possibly utilizing a network ranging measurement or other network based location determination, such as trilateration, or a proximity-based location (e.g., using WiFi). A high accuracy or precise location could be a handset-based or handset assisted GPS location or could be a physical or Internet address, depending on the application. Pricing arrangements between a location service provider utilizing the present invention and different wireless carriers will result in different costs for the different types of location fixes, typically the more precise (smaller) the location the more expensive the location dip, and the less precise (larger) the location the less expensive the location dip.

The present invention optimizes the process of reaching the end-user and its attendant costs. Integral to this aspect is tailoring the location determination and notification to the needs of the enterprise and its application, taking into account available network and end-user capabilities and preferences. Both the wireless network and the mobile device may be able to accommodate or support different location methods as described above. Additionally, some end users in certain applications may have preferences that impact what is applicable. For example, and end-user may select not to be located precisely.

In Determine Applicable Location Methods (209), based on the determined zone of relevance, the value of the notification, relevant inputs from the enterprise database, information form the end user database regarding location preferences and mobile device capability, and dynamic inputs (e.g., available wireless location methods from a wireless carrier), a determination is made of the available and applicable modes of location (e.g., coarse versus precise, network versus handset). A determination is also made of the location latency requirements corresponding to the enterprise application (e.g., location must be real time, could be cached from the previous session, or from an older historical record until a higher notification value is established in the future). Costs associated with the applicable location transaction types are extracted from internal records and compiled in 210, Determine Cost of Location.

In parallel with the determination of location requirements and its costs, in 211 a determination is made of the applicable notification methods. Notification could be to an end-user, an enterprise, an enterprise affiliate, or a third party (e.g., a parent). Applicable notification methods will depend on the identified party to receive the notification. These methods could be a voice call, a text message, a multimedia messaging service (MMS) message, an e-mail, or even a binary command (a programmatic instruction via internet protocol to a wired or mobile computer application or a wireless application protocol [WAP] push). These clearly have different suitability, effectiveness and time criticality in reaching the end-user or desired $3^{rd}$ party to be notified. For example, an e-mail would not be suitable to reach a basic feature flip phone in a timely manner. Other modes of communication may not be supported by the end user either.

Key pieces of information extracted from prior steps in the process are utilized by the Determine Applicable Notification Methods logic in block 211. In one embodiment, information gleaned from the user profile database, such as mobile device class and preferences, e.g., about preferred notification methods, are utilized together with information from the enterprise related to its business objective or relevant situation, and information on its in-area versus out-of-area wireless pricing that may apply. This information is combined with the determined zone of relevance in the cost computation. The size of the zone of relevance is important since there may be potentially many users to reach in a larger zone. The costs for the applicable notification methods are computed in block 212.

Whereas the above steps are shown in FIG. 2 as being in parallel, occurring after a sequential set of steps, the exact sequence or order of steps could be different without altering the nature of the present invention.

A comparison of the value of notification to the determined costs of location and notification is performed in block 213. In block 214, the value of notification is compared to a cost threshold. When the cost threshold is crossed the notification is sent (block 215). When the threshold is not crossed, the notification is not sent and instead, the notification update requirements are determined, in block 216. One or more values and costs may be part of the comparison and one or more thresholds may be employed simultaneously, to support differentiated notifications, even to users affiliated with the same enterprise and the same triggering event that launches the overall process in FIG. 2. It is possible, for example, to decide to notify a small group of end-users who are more geographically proximate to a point of interest using a text message while notifying a wider group using a lower cost, higher latency e-mail method.

With the applicable location determination methods identified in block 209, their associated costs determined in block 210, and the decision made (in block 214) to either notify (block 215) or not notify the end user (block 216), the location update requirement is set in block 216. It may be necessary to locate the end user coarsely then precisely, or precisely more than once, or just coarsely, or not at all and use rough information from the previous location pre-filtering step (205). The serving wireless network is queried for location (217) per these requirements and the location result is logged. The logged location and notification decision (218) are used in subsequent iterations of Determine Value of Notification and as a historical record for future reference.

The process illustrated in FIG. 2 is then repeated as needed. The entire process may be repeated or only parts of it if some longer term information, e.g., from the databases has not changed. For example, an iteration of the flow maybe applied to only adjust the value of notification and the zone of relevance based on the identified location and notification methods, their costs and an associated earlier decision on whether to notify the end-user.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer-implemented method for determining a zone of relevance for locating a wireless end-user using a wireless device, and selecting a cost-effective method of communicating a related notification to a system user, the method comprising:
storing information related to an enterprise including a type of the enterprise, first cost constraints of the enterprise for locating the wireless end-user, and second cost constraints of the enterprise for sending notification to the system user, in an enterprise database;
storing information related to the wireless end-user in an end-user database;
accessing said enterprise and end-user databases to extract enterprise and wireless end-user related information;
accessing a geographical database to extract geographic information, based on information obtained from the enterprise database;
extracting relevant dynamic inputs pertaining to one or more of pricing, service availability, weather conditions, traffic conditions, emergency events, or transaction fraud probability, from one or more external sources via an application programming interface;
determining a zone of relevance which is an estimate for a geospatial area that the wireless end-user is currently located in, based on the information related to the enterprise, and the wireless end-user, wherein a size of the estimated zone of relevance vary based on said first cost constraints of the enterprise for locating the wireless end-user and traffic patterns;
determining applicable user notification communication methods within said estimated zone of relevance from a plurality of different user notification methods available for the wireless device, based on at least said second cost constraints of the enterprise for sending notifications, end-user database, and geographic database;

computing a value for said related notification to be sent to the system user by calculating a weighted average of values assigned to each of said first and second cost constraints of the enterprise, wireless end-user related information, geographical information, relevant dynamic inputs and historical use information, wherein the value of said related notification is lower when the wireless end-user is not providing consent to be located, and higher when the wireless end-user is providing consent to be located;

determining a cost for each of said determined applicable user notification communication methods within said estimated zone of relevance, wherein said costs for said communication methods depend on the size of the estimated zone of relevance, wherein the smaller the size of the estimated zone of relevance the higher cost for locating the wireless end-user, and the larger the size of the estimated zone of relevance the lower cost for locating the wireless end-user;

calculating a notification value-cost ratio for each of said determined applicable user notification communication methods versus the computed value of said related notification; and communicating said related notification to the system user using a selected user notification communication method from said determined applicable user notification communication methods, when said notification value-cost ratio for said selected user notification communication method is below the first and second cost constraints of the enterprise for locating the wireless end-user and sending notification to the system user, and determining location update requirements otherwise.

2. The method of claim 1 wherein the system user to be notified is one or more of a mobile end-user, an enterprise, an enterprise affiliate, and an interested third party.

3. The method of claim 1, wherein the enterprise is a provider or user of one or more of mobile marketing, workforce management, asset tracking, transportation, emergency alerting, call centers, banking, and fraud detection.

4. The method of claim 1, wherein the enterprise database includes identification information of the enterprise, enterprise type, service objectives, and service rules.

5. The method of claim 4, wherein the enterprise service rules includes cost constraints, information latency requirements, privacy rules and user consent rules.

6. The method of claim 1, wherein the end-user database includes an enterprise affiliation, key addresses, interests, habits, income category, and preferences.

7. The method of claim 6, wherein the end-user preferences includes a chosen method to consent to being located, constraints on the location, and preferred notification methods.

8. The method of claim 1, wherein the geographic database includes information on area morphology and density, demographics, point of interest to the enterprise, traffic patterns, and climate.

9. The method of claim 1, wherein the dynamic inputs extracted from external sources comprise relevant information from one or more of a designated affiliate of the enterprise, a wireless carrier, a weather service, a traffic service, a third party with relevant information to the user to be notified.

* * * * *